Aug. 6, 1940.   J. C. CROWLEY   2,210,112
VALVE STEM
Filed April 6, 1937

INVENTOR.
JOHN C. CROWLEY
BY Kwis Hudson & Kent
ATTORNEYS

Patented Aug. 6, 1940

2,210,112

UNITED STATES PATENT OFFICE 2,210,112

VALVE STEM

John C. Crowley, Cleveland Heights, Ohio, assignor to The Dill Manufacturing Company, Cleveland, Ohio, a corporation of Ohio Application April 6, 1937, Serial No. 135,288

8 Claims. (Cl. 152—429)

This invention relates to a valve stem for inflatable articles, such as pneumatic tire tubes, and particularly it relates to an improved valve stem and securing it to an inflatable article.

An object of the invention is to provide a valve stem construction which may be united to the inflatable article with which it is used so as to become an integral part thereof and wherein the union between the stem and the article possesses a large degree of strength and thus eliminates the possibility of the stem being blown or pulled away from the article.

Another object of the invention is to provide an improved valve stem which is so constructed and which can be so attached to an inflatable article as to obviate any likelihood of air leaking from the article and around the stem.

A further object is to provide an improved valve stem which is so constructed that it can be joined or attached to an inflatable rubber article during the curing or vulcanizing of the latter.

Further and additional objects and advantages not hereinbefore referred to will become apparent hereinafter during the detailed description of two embodiments of the invention which are illustrated in the accompanying drawing wherein Fig. 1 is a part elevational and part sectional view of the elements forming a valve stem embodying the invention arranged in spaced relation and showing their construction and form prior to being assembled into the valve stem;

Figure 1:
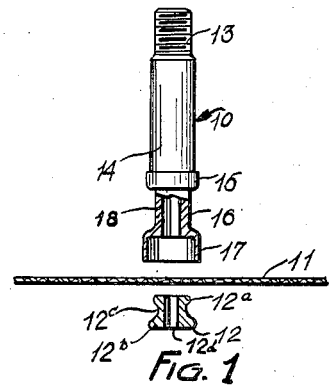
Figure 2:
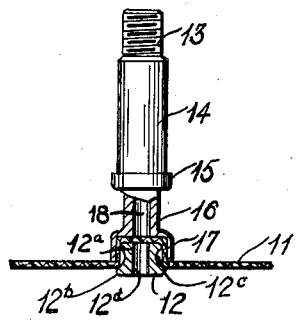
Fig. 2 is a view similar to Fig. 1 but shows the elements after they have been brought together into the valve stem but prior to their final and permanent connection into the valve stem construction.
Figure 3:
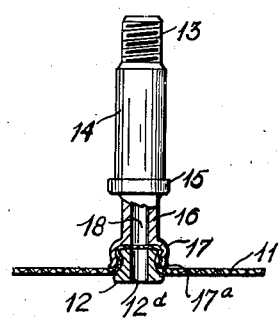
Fig. 3 is a view similar to Figs. 1 and 2 but shows the elements in final and permanently assembled and interlocked relationship in the valve stem construction.
Figure 4:
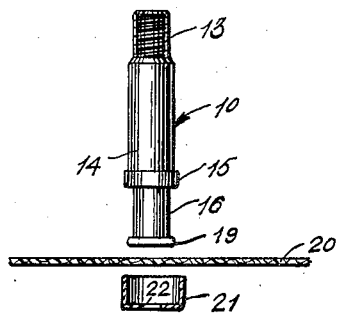
Figure 5:
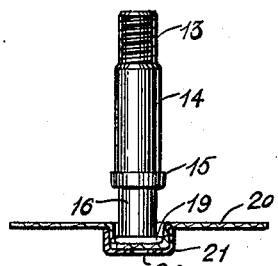
Figure 6:
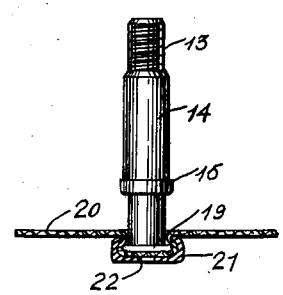
Figures 7, 8:
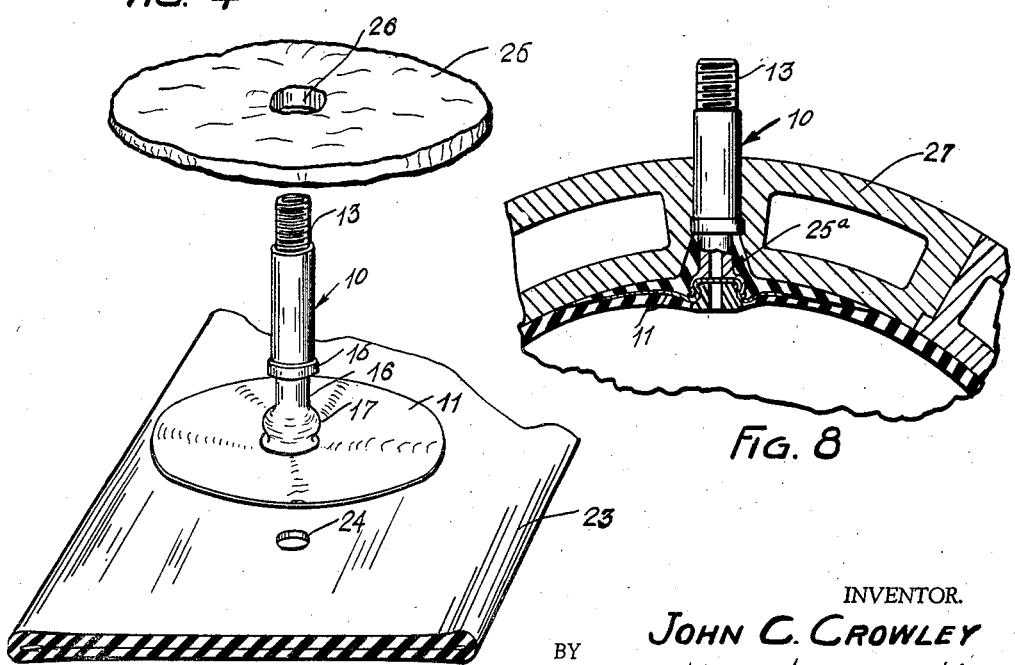

Figs. 4, 5, and 6 are views similar to Figs. 1, 2, and 3, respectively, but illustrate a modified form of valve stem construction embodying the present invention;

Fig. 7 is a fragmentary perspective view of a tire tube and a valve stem embodying the present invention, together with a piece or patch of rubber used in securing the stem to the tube; the tube, the stem, and the patch or piece of rubber being shown in spaced apart relationship; and Fig. 8 is a fragmentary sectional view through a curing mold and shows the manner in which the stem is secured to the tire tube or inflatable article as the latter is vulcanized or cured.

The valve stem shown in Figs. 1 to 3 inclusive comprises three elements, namely, the stem proper 10, the base 11, and the base holding or securing member 12. The stem proper 10 is provided at its outer end with a reduced threaded nipple 13 and with a smooth cylindrical enlarged portion 14 lying intermediate the nipple 13 and an annular rib 15. The stem proper 10 below the annular rib is provided with a reduced portion 16 that terminates at its lower end in an enlarged downwardly facing cup-shaped portion 17. The stem 10 is provided with a bore 18 extending therethrough and having, as will be well understood, an internal configuration (not shown) such as to receive the conventional valve insides or valve core.

The base 11 comprises a disk of suitable flexible air-tight material, such as rubberized fabric. The base securing member 12 is of a size such as to fit in the cup-shaped portion 17 of the stem proper and has a reduced end 12a and an enlarged end 12b between which is an annular groove 12c. A passage 12d through the member 12 is arranged to align with the bore 18 in the stem when the stem, the base, and the securing member have been assembled.

In assembling the elements of the stem, they may be relatively located with respect to each other in the position shown in Fig. 1, after which the securing member is pushed into the cup-shaped portion 17 and carries with it a part of the base 11 as clearly indicated in Fig. 2. When the elements have been thus positioned, the cup-shaped portion 17 of the stem proper is then deformed, as indicated at 17a in Fig. 3, to force the base 11 into the groove 12c of the member 12 and to lock the elements together in assembled relationship; this deforming of the cup-shaped portion 17 being preferably carried out by a rolling or spinning operation. Once the elements have been thus assembled and interlocked, it will be clear that they constitute in effect a permanent integral mechanical structure.

The form of the invention illustrated in Figs. 4 to 6 inclusive comprises a stem proper which is identical with the stem shown in Figs. 1 to 3 inclusive, except that the lower end of the reduced portion 16 is provided with an annular flange 19 in place of the cup-shaped portion 17. The base 20 of the stem shown in Figs. 4 to 6 inclusive is likewise a disk of suitable flexible air-tight material, such as rubberized fabric, while the securing member 21 constitutes a small cup-shaped washer the bottom of which is provided with an opening 22.

The elements of the valve stem construction shown in Figs. 4 to 6 are brought together in the position shown in Fig. 5 wherein the lower end of the stem proper, including the flange 19, is located within the cup-shaped securing member 21 while a portion of the fabric base 20 lies between the end of the stem and the cup-shaped member 21. When the elements have been thus positioned, the upper circumferential edge of the wall of the cup-shaped member 21 is bent or peened over the flange 19 on the lower end of the valve stem, as clearly shown in Fig. 6, to securely connect the base 20 to the stem, at which time the three elements of the stem constitute in effect a permanent integral structure.

The bases 11 and 20 can be previously provided with centrally disposed openings for aligning with the bores 18 of the valve stems and the openings through the securing members, but preferably such bases are not so provided and openings through the same are formed after the elements of the stems have been assembled and interlocked. Preferably, the provision of the openings in the bases is carried out during the attachment of the stems to the tire tubes or other inflatable articles with which they are used, as will now be explained.

An uncured or green rubber tube or inflatable rubber article is indicated at 23 in Fig. 7, and the base 11 or 20 of the valve stem, as the case may be, is positioned upon the exterior of the tube, in the proper location, as, for example, in such position that the opening in the securing member of the valve stem will align with an opening 24 formed in the tube. Of course, it is not necessary to provide the tube with a preformed opening as it will later be pointed out that the opening may be formed therein during the vulcanizing process. A piece of uncured or green rubber 25 provided with a substantially centrally disposed opening 26 is passed downwardly of the valve stem and is positioned over the base 11 and lies in engagement with the exterior of the tube and acts to temporarily hold the stem in position. The tube with the stem and the piece of rubber thereon is now placed in a suitable curing mold, such, for example, as a curing mold of the watch case type, a portion of which is illustrated in section at 27 in Fig. 8. The stem proper 10 will project through a suitable opening in the mold to the exterior thereof and an air chuck or other suitable means may be applied to the outer end of the stem for the purpose of inflating the tube within the mold for the curing or vulcanizing operation.

If the base and the tube have not been previously perforated, an electric needle can be inserted through the stem for the purpose of perforating the base and the tube, and, if desired, this needle can be of such construction that pressure fluid may be passed therethrough into the tube to inflate the same.

It will be understood that, when the tube is inflated and heat applied to the mold in the well known manner, the crude or uncured tube and piece of rubber 25 will be vulcanized together and become in effect an integral piece of rubber with the base 11 embedded therein.

In Fig. 8 the opening in the mold for the valve stem is shown as having an enlarged tapered portion at its inner end, wherefore, the rubber of the uncured piece of rubber 25 will flow into such tapered portion under the pressure exerted by the inflated tube and will provide a short tapered rubber stem or spud 25a surrounding the reduced portion 16 of the valve stem proper. Of course, in certain types of stems, the rubber need not extend outwardly of the lower end of the reduced portion 16, while in still other types the rubber may extend outwardly of the stem substantially to the nipple 13 thereof, as will be well understood in the art, and in such instances the opening in the mold will be shaped accordingly.

The valve stem, when secured in this manner to the tube or inflatable rubber article, becomes in effect an integral part thereof, which fact, together with the reenforcement provided by the base 11 that is embedded in the tube or article, obviates all likelihood of the stem pulling or blowing out of the tube or article.

A valve stem embodying the present invention, since it can be attached to the tube or article during the manufacture of the same, namely, during the curing or vulcanizing thereof, lends itself to inexpensive and efficient production of tire tubes or inflatable articles. It will be noted that even if the adhesion between the valve stem and the rubber is not of the best, still no air can escape from the article around the stem since in attempting to do so it would be stopped by the rubberized fabric base 11 and would of necessity have to follow a passage into the bore of the valve stem which bore is sealed by the valve insides or core. This is extremely important since it is not always possible to obtain good adhesion between rubber and metal and certain difficulty has been experienced heretofore in the escaping of air from the tube or inflatable article around the exterior of the valve stem that is connected thereto.

Although preferred forms of the invention have been illustrated and described herein, it should be understood that the invention is susceptible of various modifications and adaptations within the scope of the appended claims.

Having thus described my invention, I claim:

1. A valve stem comprising a stem proper, a flexible base, and a securing member; said base extending between an end of the stem proper and said securing member, said end of the stem proper and said member having interlocking deformed portions which permanently unite and hold in assembled relationship the stem proper and the securing member with the base engaged by and clamped between the stem proper and the securing member.

2. A valve stem comprising a stem proper, a base formed of rubberized fabric, and a securing member; said base having a portion located between one end of the stem proper and said securing member, and said end of the stem proper and said securing member having interlocking deformed portions permanently holding the stem proper, the base, and the member in assembled relationship.

3. A valve stem comprising a stem proper, a flexible base, and a securing member; said stem proper having one end which relatively interfits with said securing member, said base having a portion located between said end of the stem proper and said securing member, and means for locking the parts in permanently assembled relationship including interlocking deformed portions on said stem proper and said member.

4. A valve stem comprising a stem proper provided with an enlarged cup-shaped portion at its lower end, a flexible base, and a securing member; said base having a portion located in said cup-shaped portion of said stem and receiving said securing member, said cup-shaped portion of said stem being deformed to interlock with said base and said member.

5. A valve stem comprising a stem proper provided at one end with an enlarged cup-shaped portion, a flexible base having a portion located within the cup-shaped portion of the stem proper, and a securing member located within said portion of the base and provided with a groove; said cup-shaped portion of the stem proper being deformed into said groove of the securing member to interlock therewith and hold the stem proper, the base, and the securing member in assembled relationship.

6. A valve stem comprising a stem proper provided at one end with a flange, a flexible base, and a cup-shaped securing member; said base being located between the flanged end of the stem proper and the bottom of said cup-shaped securing member and in engagement with said bottom, and said cup-shaped securing member having its upper edge deformed over said flanged end to clamp the securing member, the base, and the stem proper in assembled relationship.

7. In combination, an inflatable rubber article, and a valve stem therefor comprising a flexible base embedded in the rubber article, a stem proper, and a securing member, said base extending between the inner end of the stem proper and said securing member, and said stem proper and said securing member being provided with interlocking deformed portions permanently uniting the same together and with said base.

8. A valve stem comprising a stem member proper, a flexible base, and a securing member; said securing member and the inner end of said stem member having cooperating portions one of which is cup-shaped, said base extending between said end of the stem member and said securing member and having a portion located in said cup-shaped portion, said cup-shaped portion being deformed into interlocking engagement with the cooperating portion of the other member to permanently unite said members and said base.

JOHN C. CROWLEY.